(12) United States Patent
Kim et al.

(10) Patent No.: US 7,738,589 B2
(45) Date of Patent: Jun. 15, 2010

(54) DIGITAL BROADCASTING TRANSMISSION/RECEPTION CAPABLE OF IMPROVING A RECEIVING PERFORMANCE AND A SIGNAL PROCESSING METHOD THEREOF

(75) Inventors: Joon-soo Kim, Seoul (KR); Dong-hoon Lee, Suwon-si (KR); Jung-won Kwak, Seoul (KR); Chan-sub Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1706 days.

(21) Appl. No.: 10/891,184

(22) Filed: Jul. 15, 2004

(65) Prior Publication Data

US 2005/0015818 A1    Jan. 20, 2005

Related U.S. Application Data

(60) Provisional application No. 60/486,915, filed on Jul. 15, 2003.

(30) Foreign Application Priority Data

Sep. 16, 2003    (KR) ...................... 10-2003-0064001

(51) Int. Cl.
    *H04L 27/00*    (2006.01)
(52) U.S. Cl. ...................... 375/295; 375/260; 375/324; 370/208; 370/500
(58) Field of Classification Search ......... 375/229–232, 375/260, 295, 324, 343; 725/146, 147, 116, 725/117; 455/63.1, 65, 68; 370/208, 500, 370/150
See application file for complete search history.

(56) References Cited

U.S. PATENT DOCUMENTS 5,838,728 A * 11/1998 Alamouti et al. ............ 375/265
6,185,255 B1    2/2001 Twitchell et al.

(Continued)

FOREIGN PATENT DOCUMENTS

EP    1 089 451 A1    4/2001

(Continued)

OTHER PUBLICATIONS

Franco Mazzenga, "Channel estimation and equalization for M-QAM transmission with a hidden pilot sequence", Jun. 2000, IEEE transactions on broadcasting, vol. 46 No. 2, pp. 170-176.*

*Primary Examiner*—David C Payne
*Assistant Examiner*—Rahel Guarino
(74) *Attorney, Agent, or Firm*—Sughrue Mion, PLLC

(57) ABSTRACT

A digital broadcasting transmission/reception system having an improved receiving performance and a signal processing method thereof. The transmission system includes a FEC encoder encoding an incoming signal according to a certain FEC scheme, a sync insertion unit inserting a sync into the encoded signal, a hidden pilot insertion unit inserting a hidden pilot into the sync-inserted signal, a pilot insertion unit inserting a pilot tone into the hidden-pilot-inserted signal, a pulse shaping filter pulse-shaping the pilot-tone-inserted signal with a certain roll-off factor, and a RF unit transmitting the pulse-shaped signal through a transmission channel band. Performances of equalization and synchronization acquirement can be enhanced in multipath conditions by utilizing the transmission system containing the hidden pilot.

21 Claims, 10 Drawing Sheets

U.S. PATENT DOCUMENTS

| | | | |
|---|---|---|---|
| 2001/0047503 A1* | 11/2001 | Zhang | 714/784 |
| 2002/0001319 A1* | 1/2002 | Ogino et al. | 370/527 |
| 2002/0181599 A1* | 12/2002 | Choi et al. | 375/240.27 |

FOREIGN PATENT DOCUMENTS

| | | | |
|---|---|---|---|
| KR | 1999-0082892 A | 11/1999 |
| KR | 2001-0010456 A | 2/2001 |
| KR | 2001-0055543 A | 7/2001 |
| KR | 2001-0111667 A | 12/2001 |
| WO | 93/09622 A1 | 5/1993 |

\* cited by examiner (a) 8-LEVEL SIGNAL (b) VSB SIGNAL COMBINED WITH HIDDEN PILOT (c) BINARY HIDDEN PILOT SIGNAL

DIGITAL BROADCASTING TRANSMISSION/RECEPTION CAPABLE OF IMPROVING A RECEIVING PERFORMANCE AND A SIGNAL PROCESSING METHOD THEREOF

CROSS-REFERENCE TO RELATED APPLICATIONS

This application claims the benefit of U.S. Provisional Application No. 60/486,915 filed Jul. 15, 2003, and Korean Patent Application No. 2003-64001 filed Sep. 16, 2003 in the Korean Intellectual Property Office, the disclosures of which are incorporated herein by reference in their entirety.

BACKGROUND OF THE INVENTION

1. Field of the Invention

The present invention relates generally to digital broadcasting transmission and reception systems. More particularly, the present invention pertains to a digital broadcasting transmission system capable of improving performance of a reception system by inserting a hidden pilot signal and a signal processing method thereof, and also a corresponding digital broadcasting reception system and a signal processing method thereof.

2. Description of the Related Art

FIG. 1 is a schematic block diagram of the United States 8-VSB DTV transmission system. The transmission system includes a forward error correction (FEC) encoder 110, a sync insertion unit 120, a pilot insertion unit 130, a pulse shaping filter 140, and a radio frequency (RF) unit 150.

The FEC encoder 110 includes a randomizer 111, a Reed-Solomon (RS) encoder 113, an interleaver 115, and a trellis encoder 117.

The randomizer 111 randomizes an incoming MPEG2-TS data packet. The RS encoder 113 assigns a RS parity of certain bytes for the error correction of data. The interleaver 115 interleaves the RS-encoded data according to a certain pattern. The trellis encoder 117 trellis-encodes the interleaved data at a 2/3 rate.

The sync insertion unit 120 inserts a segment sync and a field sync into the FEC-encoded signal. The pilot insertion unit 130 inserts a pilot tone by applying a certain DC component to data symbol of 8 levels. The pulse shaping filter 140 pulse-shapes the pilot-tone-inserted signal by use of a filter having a certain roll-off factor. The RF unit 150 up-converts the pulse-shaped signal into a signal of a RF channel band to be transmitted, and transmits the converted signal via an antenna.

FIG. 2 is a structure of a transmission frame containing the segment sync and the field sync which are inserted in the sync insertion unit 120 of FIG. 1.

The final data frame is created in a manner that an output signal from the FEC encoder 110 is mapped into a signal of 8 levels, that is, −7, −5, −3, −1, 1, 3, 5, 7, and the segment sync and field sync having a binary PN sequence of −5 and 5 levels are added to the 8-level signal.

Still referring to FIG. 2, each segment sync consists of four symbols and a whole segment including the segment sync signal consists of 832 symbols. 313 segments make up a frame, and a first segment of each frame consists of a series of a PN sequence which is the field sync.

The PN sequence is a sync known to a reception side, and is used as a reference signal for equalization.

The conventional digital broadcasting transmission system is vulnerable to the multipath environment. Accordingly, performance of a reception system depends on that of an equalizer which removes ghost components occurring in the multipath.

However, the performance degrades since the frequency of the field sync signal, which is used by the equalizer as the reference signal, is too low as shown in FIG. 2.

The more frequently the reference signal is inserted, the more likely the performance of the equalizer improves. However, the insertion frequency of the field sync in the received signal is limited since data transmission rate decreases as much as the insertion frequency increases.

SUMMARY OF THE INVENTION

To address the above shortcomings of the related art, it is an aspect of the present invention is to provide a digital broadcasting transmission system capable of maintaining a data rate of the conventional system and enhancing a receiving performance of a reception system and a signal processing method, and a corresponding digital broadcasting reception system and a signal processing method thereof.

To achieve the above aspect of the present invention, the digital broadcasting transmission system includes a FEC encoder encoding an incoming signal according to a certain FEC scheme, a sync insertion unit inserting a sync into the encoded signal, a hidden pilot insertion unit inserting a hidden pilot into the sync-inserted signal, a pilot insertion unit inserting a pilot tone into the hidden-pilot-inserted signal, a pulse shaping filter pulse-shaping the pilot-tone-inserted signal with a certain roll-off factor, and a RF unit transmitting the pulse-shaped signal through a transmission channel band.

The sync includes a segment sync inserted once per segment and a field sync inserted once per field.

Advantageously, the hidden pilot is a PN sequence of a predetermined length and having a cyclic property, and an average power of the PN sequence having the predetermined length is lower than that of the input signal.

The signal processing method of the transmission system includes encoding an incoming signal according to a FEC scheme, inserting a sync into the encoded signal, inserting a hidden pilot into the sync-inserted signal, inserting a pilot tone into the hidden-pilot-inserted signal, pulse-shaping the pilot-tone-inserted signal with a certain roll-off factor, and transmitting the pulse-shaped signal through a transmission channel band.

The reception system corresponding to the transmission system includes a tuner receiving and converting a signal of a tuned band into a signal of a baseband, a frequency recoverer compensating a frequency offset of a received signal, a timing recoverer compensating a timing offset of the received signal, a channel estimator estimating multipath by use of a hidden pilot contained in the received signal, an equalizer equalizing the received signal based on the estimated multipath, and a FEC decoder correcting errors of the received signal according to a certain FEC scheme.

The channel estimator includes a correlator acquiring a correlation value between the hidden pilot and a reference signal, and an accumulator estimating the multipath by repeatedly accumulating the correlation value a predetermined number of times so that the correlation value has a certain magnitude.

Advantageously, the reception system further includes a frequency offset estimator estimating the frequency offset based on the correlation value of the hidden pilot, and a timing offset estimator estimating the timing offset based on the correlation value of the hidden pilot.

The signal processing method of the reception system includes receiving a signal of a tuned band, compensating a frequency offset of a received signal, compensating a timing offset of the received signal, channel estimating multipath by use of a hidden pilot contained in the received signal, equalizing the received signal based on the estimated multipath, and correcting errors in the received signal according to a certain FEC scheme.

The channel estimation includes acquiring a correlation value between the hidden pilot and a reference signal, and estimating the multipath by repeatedly accumulating the correlation value a predetermined number of times so that the correlation value has a certain magnitude.

Advantageously, the method further includes estimating the frequency offset based on the correlation value of the hidden pilot, and estimating the timing offset based on the correlation value of the hidden pilot.

Accordingly, the transmission system containing the hidden pilot enhances equalization and synchronization performances even in the multipath conditions. By transmitting the low-power hidden pilot, the reception system can minimize performance degrade resulting from noise.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
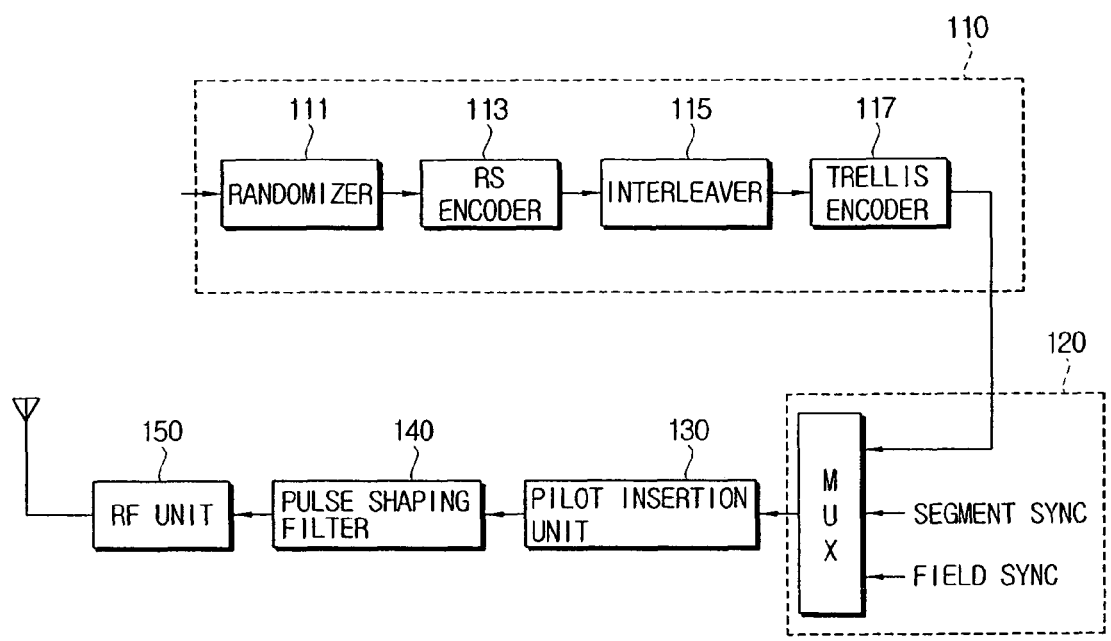
FIG. 1 is a schematic block diagram illustrating a conventional US 8-VSB transmission system.

Reference will now be made in detail to the embodiments of the present invention, examples of which are illustrated in the accompanying drawings, wherein like reference numerals refer to the like elements throughout The embodiments are described below in order to explain the present invention by referring to the drawings.

Figure 3:
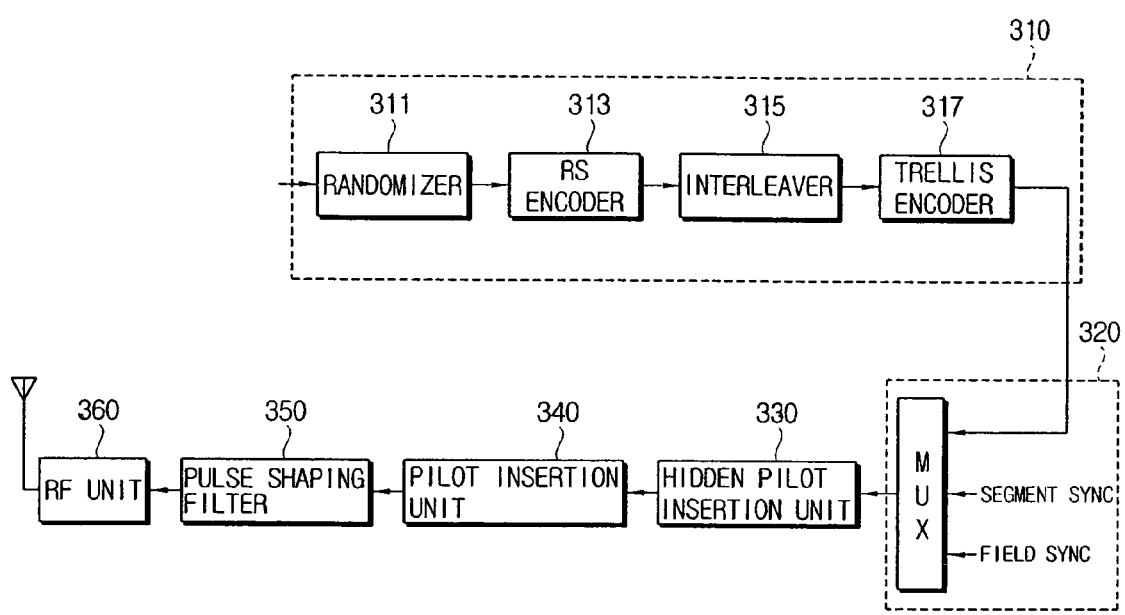
FIG. 3 is a schematic diagram illustrating a digital broadcasting transmission system according to an embodiment of the present invention.

FIG. 3 is a schematic diagram illustrating a digital broadcasting transmission system according to an embodiment of the present invention. The transmission system includes a forward error correction (FEC) encoder 310, a sync insertion unit 320, a hidden pilot insertion unit 330, a pilot insertion unit 340, a pulse shaping filter 350, and a radio frequency (RF) unit 360.

The FEC encoder 310 includes a randomizer 311, a Reed-Solomon (RS) encoder 313, an interleaver 315, and a trellis encoder 317. The randomizer 311 randomizes incoming MPEG2-TS data. The RS encoder 313 assigns a RS parity of certain bytes for the error correction of data. The interleaver 315 interleaves the RS parity-assigned data according to a certain pattern. The trellis encoder 317 trellis-encodes the interleaved data at a 2/3 rate.

Figure 2:
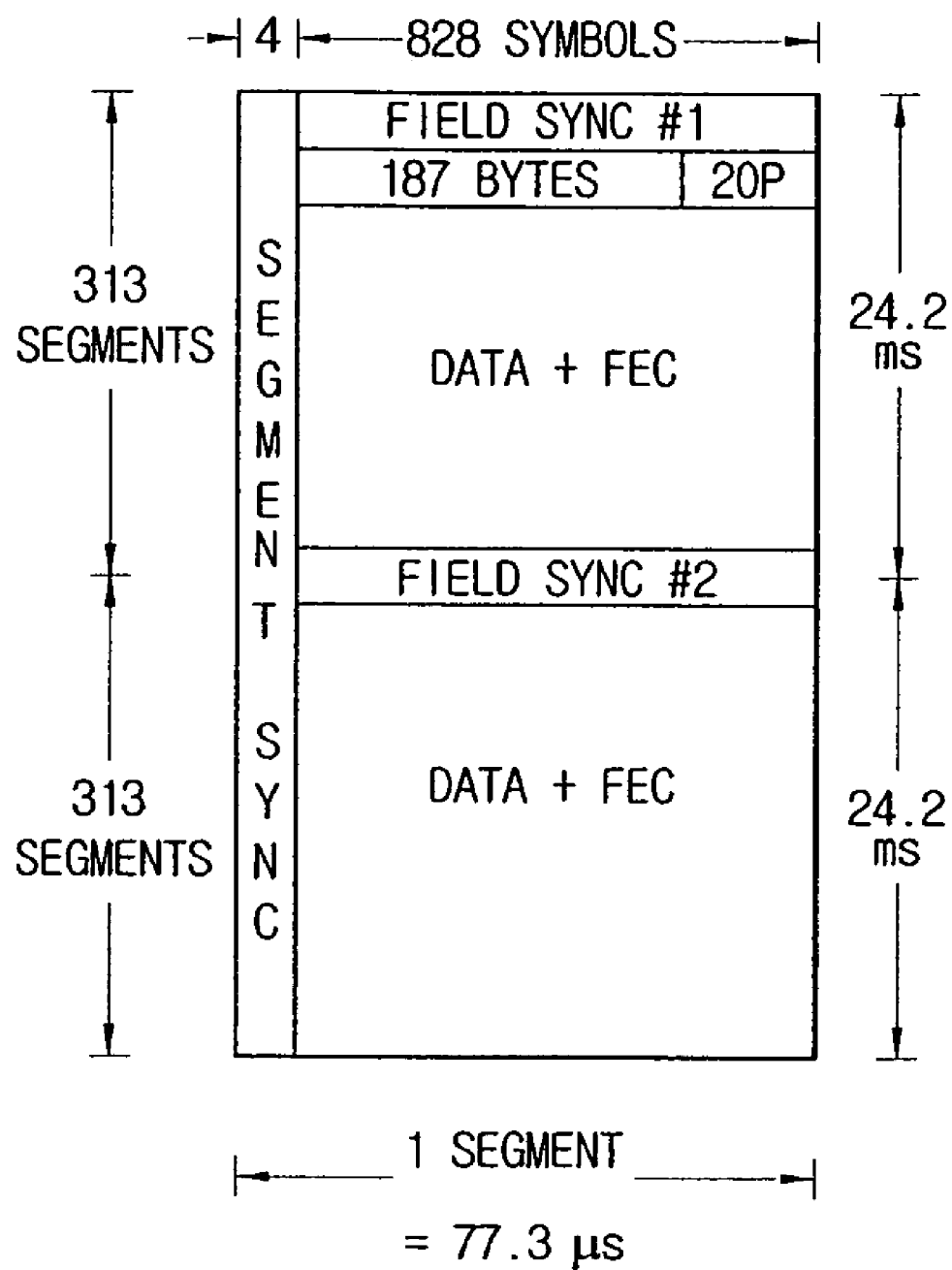
FIG. 2 is a frame structure according to the transmission system of FIG. 1.

The sync insertion unit 320 maps the FEC-encoded signal into a signal of a certain level, and inserts into the mapped signal a segment sync once per segment and a field sync once per field, to thus create the frame of FIG. 2. According to the 8-VSB transmission scheme, the certain level of the signal is eight levels and the sync is a 2-level binary signal.

The hidden pilot insertion unit 330 inserts a hidden pilot signal into the mapped signal and the sync.

Figure 4:
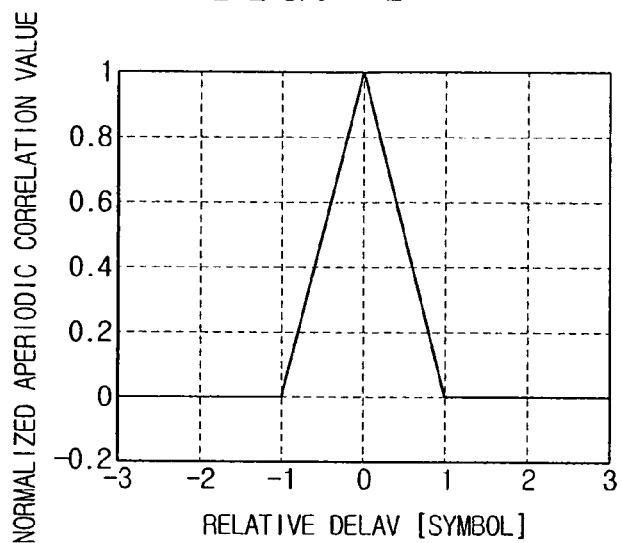
FIG. 4 is a diagram illustrating a normalized periodic correlation property of a PN sequence.

The hidden pilot uses a certain PN sequence which is a binary signal having a cyclic property. The PN sequence, that is, the hidden pilot of FIG. 4 has a normalized auto-correlation property and a power lower than an average power of the data signal.

If a length of the PN sequence is 1023 symbols, a processing gain of the reception side is about 30 dB to process the PN sequence. Hence, if the power of the 1023-symbol PN sequence is about 30 dB, power ratio of the reception side becomes 0 dB after the correlation. Consequently, it is advantageous to determine the power of the hidden pilot based on the processing gain of the reception side which corresponds to the length of the PN sequence. Influence to noise threshold of visibility (TOV) is hardly experienced in using the low-power PN sequence.

Figure 5:
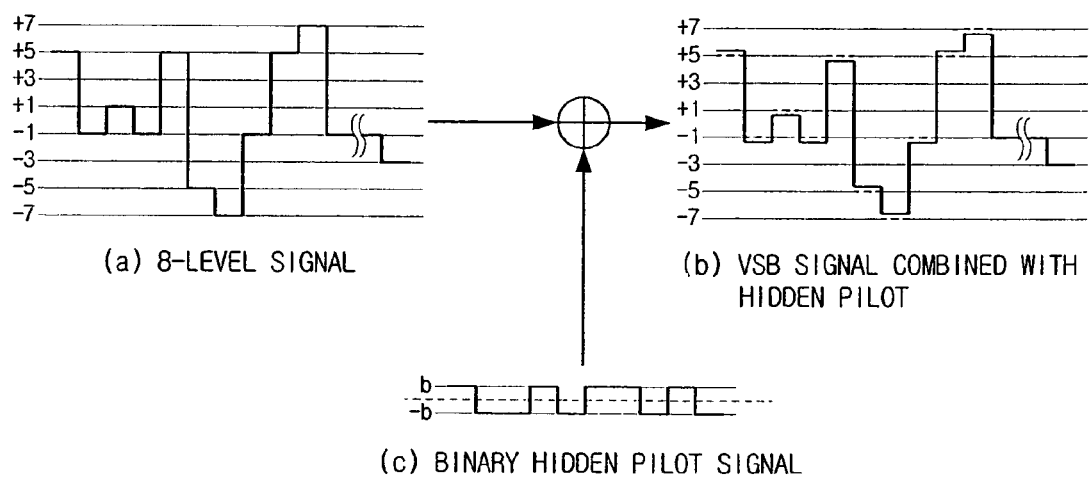
FIG. 5 is a diagram illustrating a hidden pilot being inserted into a certain signal according to an embodiment of the present invention.

FIG. 5 is a diagram illustrating the hidden pilot being inserted into the 8-level signal.

The 8-level signal is randomly distributed as shown in (a), and the 2-level PN sequence of low power as shown in (b) is added to the 8-level signal. As a result, a signal is output which seems to include a noise component of low power in the 8-level signal. The hidden pilot becomes an insignificant noise component which substantially does not degrade the performance of a reception system.

The pilot insertion unit 340 inserts one pilot tone into an edge of low frequency band in a frequency spectrum by applying a certain DC component to the hidden-pilot-inserted symbols.

The pulse shaping filter 350 pulse-shapes the signal with the pilot and pilot tone by use of a filter having a certain roll-off factor.

The RF unit 360 up-converts the pulse-shaped signal into a signal of a RF channel band to be transmitted, and transmits the converted signal via an antenna.

Figure 6:
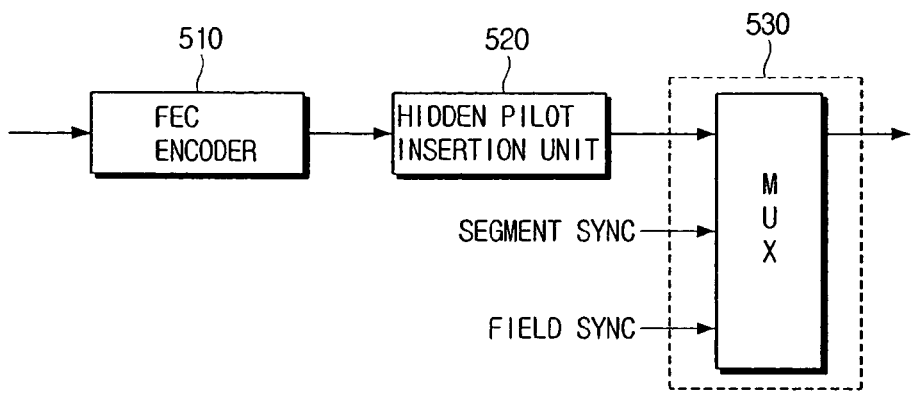
FIG. 6 is a schematic block diagram partially illustrating the transmission system according to another embodiment of the present invention.
Figure 7:
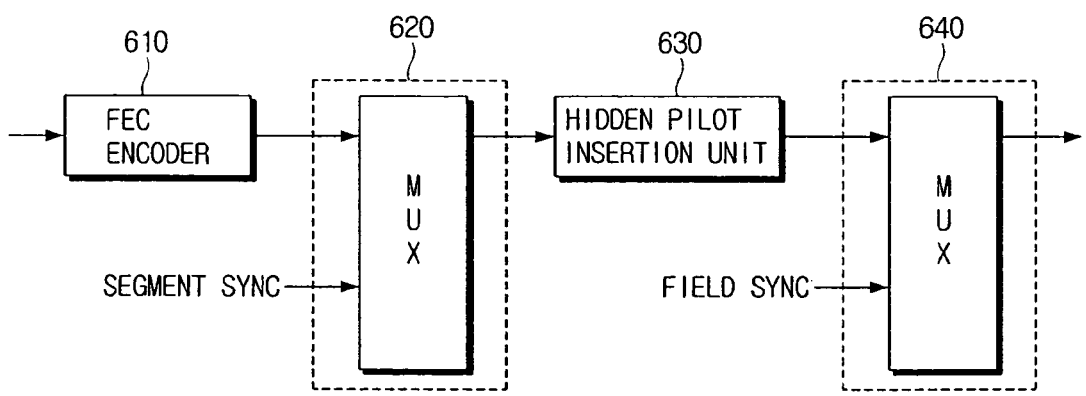
FIG. 7 a schematic block diagram partially illustrating the transmission system according to still another embodiment of the present invention.

FIG. 6 is a schematic block diagram partially illustrating the transmission system according to another embodiment of the present invention, and FIG. 7 a schematic block diagram partially illustrating the transmission system according to still another embodiment of the present invention. It will be appreciated that various embodiments can be adopted based on positions containing the sync and the hidden pilot.

Referring now to FIG. 6, the hidden pilot is inserted into other symbols excluding the segment sync within the segment symbols.

The hidden pilot insertion unit 520 inserts the hidden pilot by applying a certain PN sequence to the signal which is encoded through randomizing, RS encoding, interleaving, and trellis encoding in the FEC encoder 510. The length of the PN sequence which is the hidden pilot, can vary. For example, if applying the 8-VSB transmission scheme, the length of the PN sequence corresponds to 828 symbols excluding the 4-symbol segment sync within a 832-symbol segment.

The sync insertion unit 530 inserts the segment sync and the field sync, respectively, into the hidden-pilot-inserted signal. Next, the pilot tone is inserted. The processed signal is pulse-shaping-filtered and transmitted through a RF channel.

Referring now to FIG. 7, the hidden pilot is inserted into entire symbols of a segment.

The first sync insertion unit 620 inserts the segment sync once per segment into a signal which is encoded in the FEC encoder 610. The hidden pilot insertion unit 630 inserts the hidden pilot by applying a certain PN sequence to the segment-sync-inserted signal, that is, entire symbols of the segment.

The length of the PN sequence which is the hidden pilot, can vary. For example, if applying the 8-VSB transmission scheme, the length of the PN sequence may correspond to entire 832 symbols of the segment.

The second sync insertion unit 640 inserts the field sync once per field into the hidden-pilot-inserted signal. Next, the pilot tone inserted. The processed signal is pulse-shaping-filtered and transmitted through a transmission channel.

Figure 8:
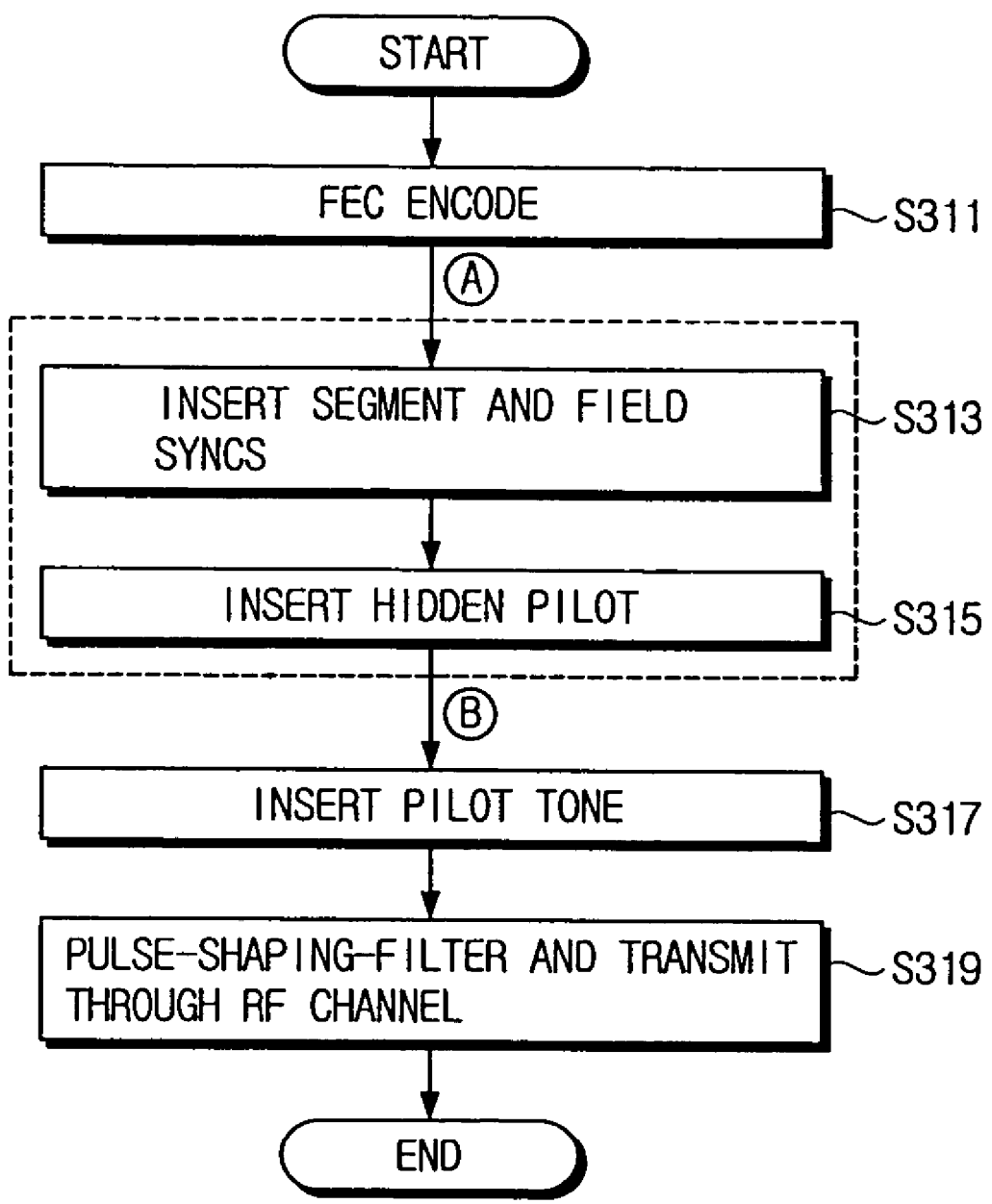
FIG. 8 is a flowchart illustrating exemplary steps of a signal processing method of the transmission system according to an embodiment of the present invention.

FIG. 8 is a flowchart illustrating exemplary steps of a signal processing method of the transmission system according to an embodiment of the present invention, which is described below.

The FEC encoder 310 encodes the MPEG2-TS data signal through randomizing, RS encoding, interleaving, and trellis encoding at step S311.

The sync insertion unit 320 inserts the segment sync once per segment and the field sync once per field with respect to the encoded signal at step S313.

The hidden pilot insertion unit 330 inserts the hidden pilot with respect to the encoded signal and the syncs at step S315.

The pilot insertion unit 340 inserts one pilot tone into the hidden-pilot-inserted signal which is the PN sequence of low power at step S317.

The pilot-tone-inserted signal is pulse-shaping-filtered by the pulse shaping filter 350 having a certain roll-off factor and transmitted by the RF unit 360 through the transmission channel at step S319.

Figure 9A:
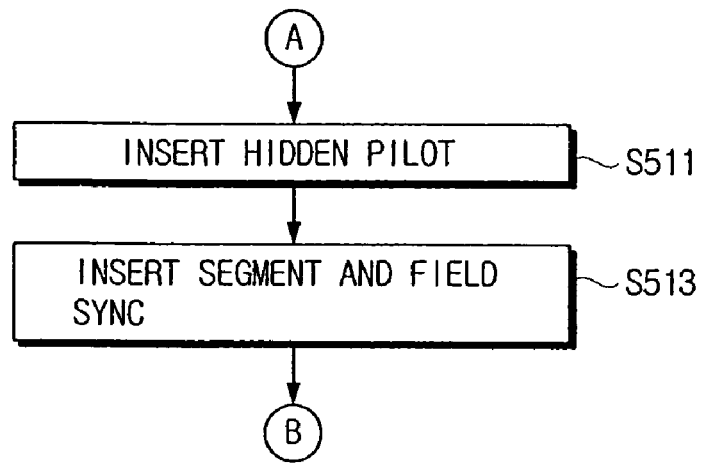
FIGS. 9A and 9B are partial flowcharts illustrating exemplary hidden pilot processing steps corresponding to the transmission systems of FIGS. 6 and 7.
Figure 9B:
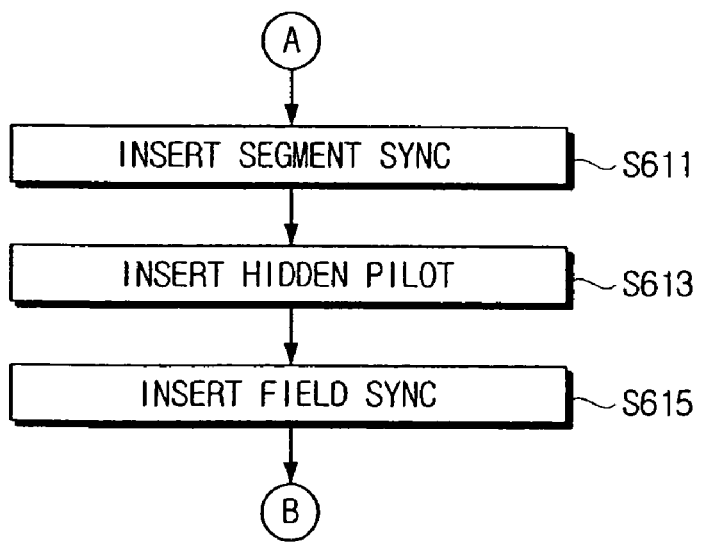

FIGS. 9A and 9B are flowcharts illustrating exemplary hidden pilot processing steps of the transmission systems of FIGS. 6 and 7.

FIG. 9A corresponds to the transmission system of FIG. 6. The hidden pilot insertion unit 520 inserts the hidden pilot into the FEC-encoded signal at step S511. The sync insertion unit 530 inserts the segment sync and the field sync, respectively, into the hidden-pilot-inserted signal. Next the pilot tone is inserted at step S513. The processed signal is pulse-shaping-filtered and transmitted through the RF channel as mentioned above.

FIG. 9B corresponds to the transmission system of FIG. 7. The first sync insertion unit 620 inserts the segment sync once per segment into the FEC encoded signal at step S611. The hidden pilot insertion unit 630 inserts the hidden pilot into the segment-sync-inserted signal, that is, into entire symbols, of the segment at step S613.

The second sync insertion unit 640 inserts the field sync once per field into the hidden-pilot-inserted signal at step S615. Next the pilot tone is inserted. The processed signal is pulse-shaping-filtered and transmitted through the transmission channel as mentioned above.

Hereinafter, enhancement of equalization and synchronization performances is described with respect to a digital broadcasting reception system according to the transmission scheme using the inserted hidden pilot.

Figure 10:
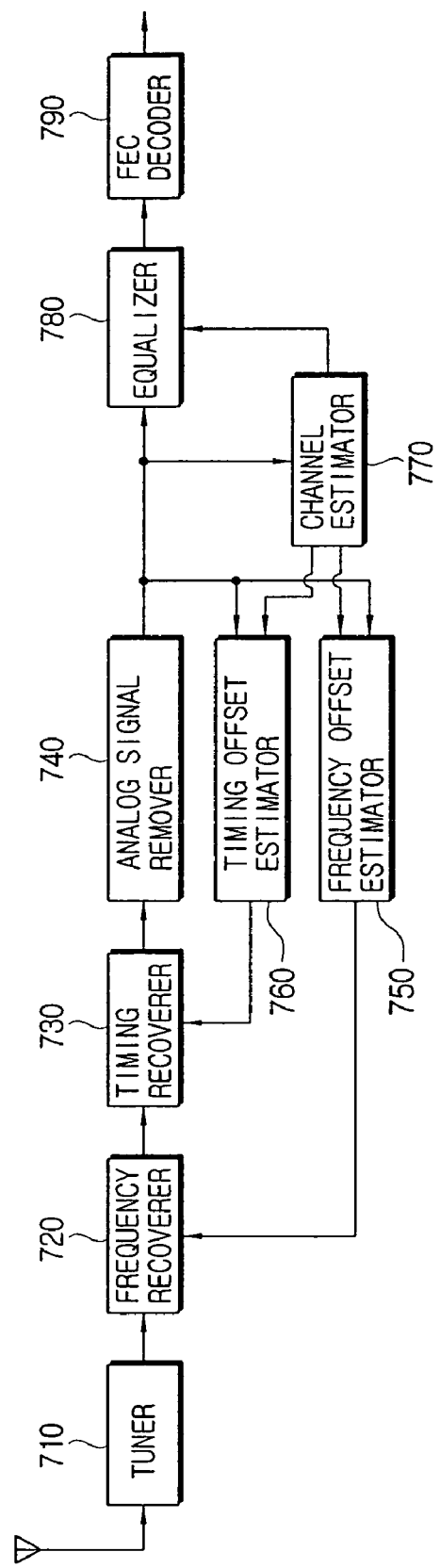
FIG. 10 is a schematic block diagram illustrating a digital reception system according to an embodiment of the present invention.

FIG. 10 is a schematic block diagram illustrating the reception system, which is superior in equalization and synchronization by utilizing the hidden pilot according to an embodiment of the present invention.

The reception system includes a tuner 710, a frequency recoverer 720, a timing recoverer 730, an analog signal remover 740, a frequency offset estimator 750, a timing offset estimator 760, a channel estimator 770, an equalizer 780, and a FEC encoder 790.

The tuner 710 converts a received signal of a tuned band into a signal of a baseband.

The frequency recoverer 720 compensates a frequency offset estimated in the frequency offset estimator 750.

The timing recoverer 720 compensates a timing offset estimated in the timing offset estimator 760.

The analog signal remover 740 discards an analog signal contained in the received signal of the tuned band.

The frequency offset estimator 750 estimates a frequency offset initially using the pilot-tone of the received signal. Next, the frequency offset estimator 750 estimates the frequency offset based on correlation values of the hidden pilot provided from the channel estimator 770.

The timing offset estimator 760 estimates a timing offset initially using the sync and data signals. Next the timing offset estimator 760 estimates the timing offset based on the correlation values of the hidden pilot provided from the channel estimator 770.

The channel estimator 770 estimates multipath using the hidden pilot in the received signal, which will be described below in greater detail with reference to FIG. 11.

The equalizer 780 removes the multipath which is estimated in the channel estimator 770 using the hidden pilot.

The FEC decoder 790 detects and corrects errors in correspondence to the FEC encoding scheme of the transmission system of FIG. 3.

Figure 11:
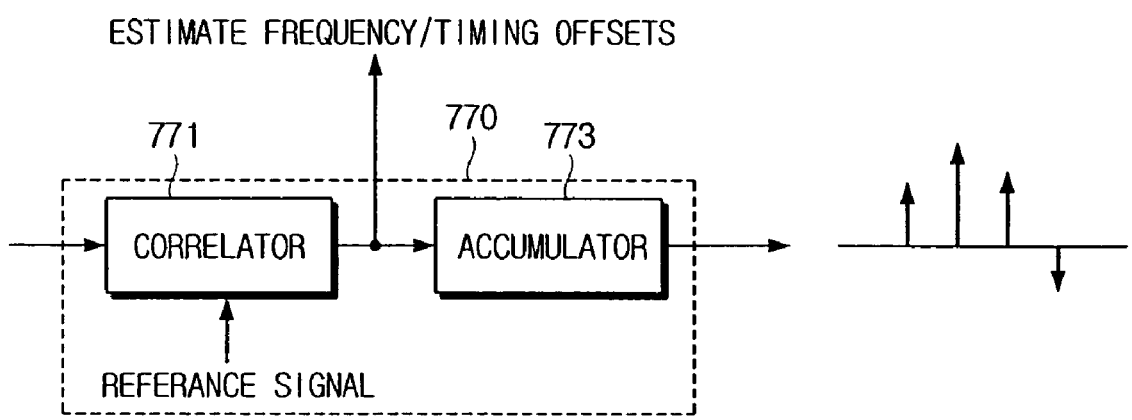
FIG. 11 is a detailed block diagram illustrating the channel estimator of FIG. 10.

FIG. 11 is a detailed block diagram of the channel estimator 770 of FIG. 10.

The channel estimator 770 includes a correlator 771 and an accumulator 773.

The correlator 771 acquires a correlation value between the hidden pilot signal of the received signal and a reference signal. The reference signal is the same as the PN sequence which is the hidden pilot inserted at the transmission side. If the hidden pilot of the received signal is identical with the reference signal based on a normalized auto-correlation property of the PN sequence, the correlation value becomes a peak value. If not, the correlation value becomes '0'.

A correlation value with respect to a received signal of multipath channel conditions is provided with a channel delay profile corresponding to the multipath.

The accumulator 773 repeatedly accumulates the correlation value of the correlator 771 a predetermined number of times. The correlation value, which is acquired using the low-power hidden pilot, is low and the low correlation value is accumulated repeatedly a predetermined number of times, to thus output the correlation value of a certain magnitude greater than the data signal. Hence, the signal output from the accumulator 773 has the channel delay profile corresponding to the multipath as shown in FIG. 11.

The estimated multipath information is furnished to the equalizer 780. The equalizer 780 equalizes based on the estimated multipath information. The frequency offset estimator 750 and the timing offset estimator 760 respectively estimate the frequency offset and the timing offset by use of the correlation property obtained by the correlator 771. The frequency recoverer 720 and the timing recoverer 730 respectively compensate the frequency offset and the timing offset that are estimated based on the correlation value of the hidden pilot.

Figure 12:
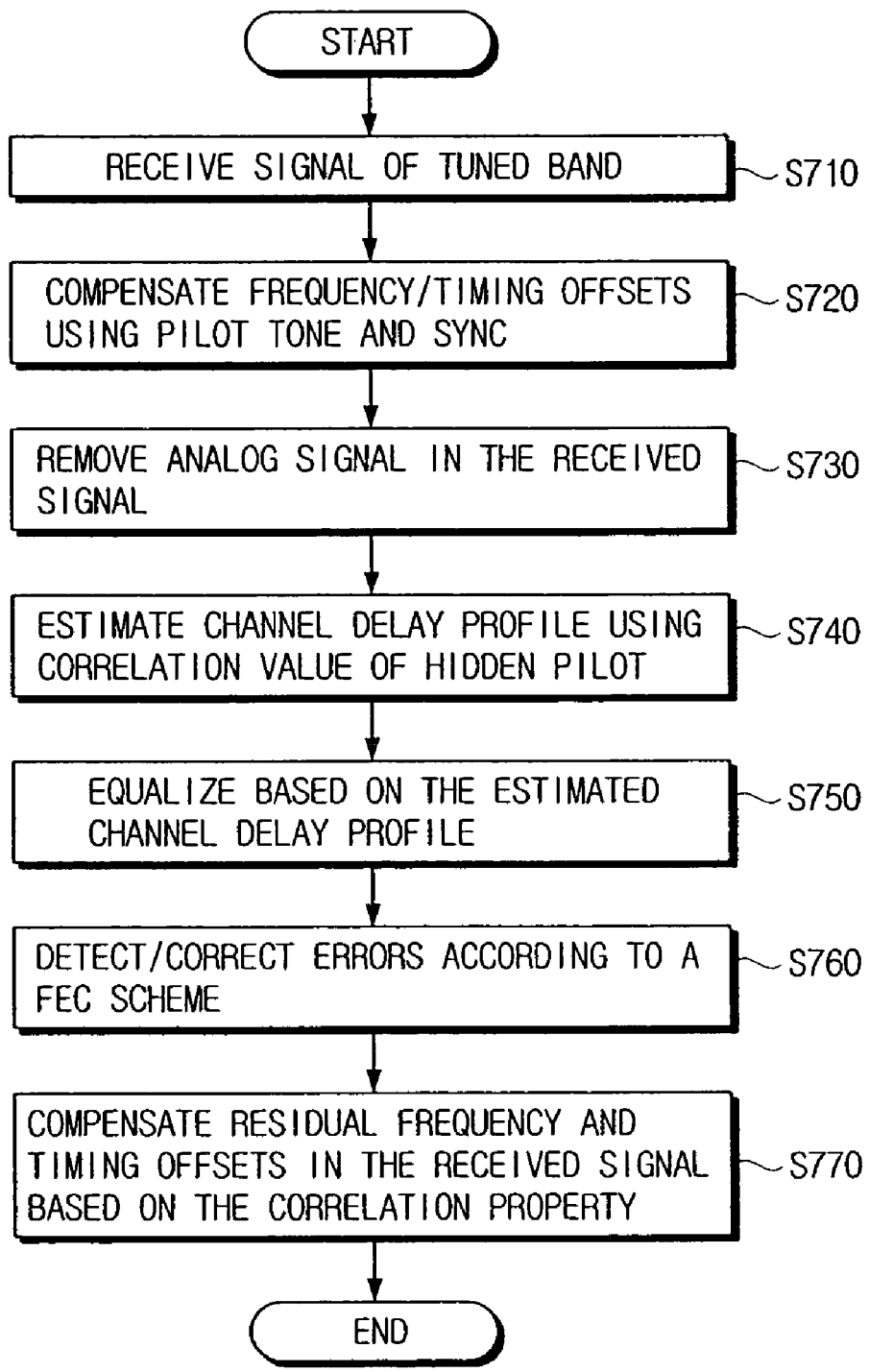
FIG. 12 is a flowchart illustrating exemplary steps of a signal processing method of the reception system according to an embodiment of the present invention.

FIG. 12 is a flowchart illustrating exemplary steps of a signal processing method of the reception system according to an embodiment of the present invention, which is described below in greater detail.

The tuner 710 receives the signal of the tuned band and converts the signal into the signal of the baseband at step S710.

The frequency recoverer 720 and the timing recoverer 730 respectively compensate the frequency offset and the timing offset that are estimated in the frequency offset estimator 750 and the timing offset estimator 760 by use of the pilot tone and the received signal at step S720.

The analog signal remover 740 discards an analog signal contained in the received signal by generating a null signal onto the analog signal position at step S730.

The channel estimator 770 estimates the channel delay profile by use of the correlation value of the hidden pilot in the received signal at step S740. Specifically, the channel estimator 770 acquires the correlation value between the hidden pilot of the received signal and the reference signal, and repeatedly accumulates the correlation value a predetermined number of times so that the correlation value has a certain magnitude. Hence, the channel delay profile of the received signal is estimated.

The equalizer 780 removes the multipath of the received signal based on the channel delay profile estimated in the channel estimator 770 at step S750.

The FEC decoder 790 detects and corrects errors with respect to the equalized received signal according to a certain FEC scheme at step S760.

The frequency offset estimator 750 and the timing offset estimator 760, respectively, estimate residual fine frequency offset and timing offset based on the correlation value of the hidden pilot provided from the channel estimator 770, and the frequency recoverer 720 and the timing recoverer 730 respectively compensate the estimated fine frequency offset and timing offset at step S770.

The equalization performance is enhanced through the equalization using the hidden pilot since the channel delay profile is estimated by the hidden pilot even in a blind mode of the conventional reception system.

The receiving performance is enhanced by estimating and compensating the residual frequency of timing offsets, which are not estimated in the related art, based on the correlation value of the hidden pilot. The equalization performance is also enhanced by estimating the channel delay profile by use of the hidden pilot.

According to an embodiment of the present invention, the transmission system including the hidden pilot results in enhancement of the equalization and synchronization acquirement performances in the multipath environment.

The reception system can minimize the performance degrade resulting from the noise by transmitting the low-power hidden pilot.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A digital broadcasting transmission system comprising:
 a forward error correction (FEC) encoder encoding an input signal according to a FEC scheme;
 a sync insertion unit inserting a sync into the encoded signal;
 a hidden pilot insertion unit inserting a hidden pilot into the sync-inserted signal;
 a pilot insertion unit inserting a pilot tone into the hidden-pilot-inserted signal;
 a pulse shaping filter pulse-shaping the pilot-tone-inserted signal with a roll-off factor; and
 a radio frequency (RF) unit transmitting the pulse-shaped signal through a transmission channel band,
 wherein the sync comprises:
  a segment sync inserted once per segment; and
  a field sync inserted once per field,
 wherein the hidden pilot has a normalized auto-correlation property and a power lower than an average power of a data signal.

2. The transmission system of claim 1, wherein the hidden pilot comprises a PN sequence of a predetermined length and having a cyclic property, and an average power of the PN sequence having the predetermined length is lower than that of the input signal.

3. A signal processing method of a digital broadcasting transmission system, comprising:
 encoding an input signal according to a forward error correction (FEC) scheme;
 inserting a sync into the encoded signal;
 inserting a hidden pilot into the sync-inserted signal;
 inserting a pilot tone into the hidden-pilot-inserted signal;
 pulse-shaping the pilot-tone-inserted signal with a roll-off factor; and
 transmitting the pulse-shaped signal through a transmission channel band,
 wherein the sync comprises:
  a segment sync inserted once per segment; and
  a field sync inserted once per field, and
 wherein the hidden pilot has a normalized auto-correlation property and a power lower than an average power of a data signal.

4. The method of claim 3, wherein the hidden pilot comprises a PN sequence of a predetermined length and having a cyclic property, and an average power of the PN sequence having the predetermined length is lower than that of the input signal.

5. A digital broadcasting transmission system comprising:
 a forward error correction (FEC) encoder encoding an input signal according to a FEC scheme;
 a hidden pilot insertion unit inserting a hidden pilot into the encoded signal;
 a sync insertion unit inserting a sync into the hidden-pilot-inserted signal;
 a pilot insertion unit inserting a pilot tone into the sync-inserted signal;

a pulse shaping filter pulse-shaping the pilot-tone-inserted signal with a roll-off factor; and a radio frequency (RF) unit transmitting the pulse-shaped signal through a transmission channel band, wherein the sync comprises:
a segment sync inserted once per segment; and
a field sync inserted once per field, and wherein the hidden pilot has a normalized auto-correlation property and a power lower than an average power of a data signal.

6. The transmission system of claim 5, wherein the hidden pilot comprises a PN sequence of a predetermined length and having a cyclic property, and an average power of the PN sequence having the predetermined length is lower than that of the input signal.

7. A signal processing method of a digital transmission system, comprising:

encoding an input signal according to a forward error correction (FEC) scheme;
inserting a hidden pilot into the encoded signal;
inserting a sync into the hidden-pilot-inserted signal;
inserting a pilot tone into the sync-inserted signal;
pulse-shaping the pilot-tone-inserted signal with a certain roll-off factor; and
transmitting the pulse-shaped signal through a transmission channel band, wherein the sync comprises:
a segment sync inserted once per segment; and
a field sync inserted once per field, and wherein the hidden pilot has a normalized auto-correlation property and a power lower than an average power of a data signal.

8. The method of claim 7, wherein the hidden pilot comprises a PN sequence of a predetermined length and having a cyclic property, and an average power of the PN sequence having the predetermined length is lower than that of the input signal.

9. A digital broadcasting transmission system comprising:

a forward error correction (FEC) encoder encoding an input signal according to a FEC scheme;
a first sync insertion unit inserting a segment sync once per segment into the encoded signal;
a hidden pilot insertion unit inserting a hidden pilot into the segment-sync-inserted signal;
a second sync insertion unit inserting a field sync once per field into the hidden-pilot-inserted signal;
a pilot insertion unit inserting a pilot tone into the field-sync-inserted signal;
a pulse shaping filter pulse-shaping the pilot-tone-inserted signal with a roll-off factor; and
a radio frequency (RF) unit transmitting the pulse-shaped signal through a transmission channel band, and wherein the hidden pilot has a normalized auto-correlation property and a power lower than an average power of a data signal.

10. The transmission system of claim 9, wherein the hidden pilot comprises a PN sequence of a predetermined length and having a cyclic property, and an average power of the PN sequence having the predetermined length is lower than that of the input signal.

11. A signal processing method of a digital broadcasting transmission system, comprising:

encoding an input signal according to a FEC scheme;
inserting a segment sync once per segment into the encoded signal;
inserting a hidden pilot into the segment-sync-inserted signal;
inserting a field sync once per field into the hidden-pilot-inserted signal;
inserting a pilot tone into the field-sync-inserted signal;
pulse-shaping the pilot-tone-inserted signal with a roll-off factor; and
transmitting the pulse-shaped signal through a transmission channel band, and wherein the hidden pilot has a normalized auto-correlation property and a power lower than an average power of a data signal.

12. The method of claim 11, wherein the hidden pilot comprises a PN sequence of a predetermined length and having a cyclic property, and an average power of the PN sequence having the predetermined length is lower than that of the input signal.

13. A digital broadcasting reception system comprising:

a tuner receiving and converting a signal of a tuned band into a signal of a baseband;
a frequency recoverer compensating a frequency offset of a received signal;
a timing recoverer compensating a timing offset of the received signal;
a channel estimator estimating multipath by use of a hidden pilot contained in the received signal;
an equalizer equalizing the received signal based on the estimated multipath; and
a forward error correction (FEC) decoder correcting errors of the received signal according to a FEC scheme, wherein the hidden pilot has a normalized auto-correlation property and a power lower than an average power of a data signal.

14. The reception system of claim 13, wherein the channel estimator comprises:

a correlator acquiring a correlation value between the hidden pilot and a reference signal; and
an accumulator estimating the multipath by repeatedly accumulating the correlation value a predetermined number of times so that the correlation value has a first magnitude.

15. The reception system of claim 14, wherein the reference signal is the same as the hidden pilot, and the reference signal comprises a PN sequence of a predetermined length having a cyclic property.

16. The reception system of claim 13, further comprising:

a frequency offset estimator estimating the frequency offset based on the correlation value of the hidden pilot; and
a timing offset estimator estimating the timing offset based on the correlation value of the hidden pilot.

17. A signal processing method of a digital broadcasting reception system, comprising:

receiving a signal of a tuned band;
compensating a frequency offset of the received signal;
compensating a timing offset of the received signal;
channel estimating multipath by use of a hidden pilot contained in the received signal;
equalizing the received signal based on the estimated multipath; and
correcting errors in the received signal according to a forward error correction (FEC) scheme, wherein the hidden pilot has a normalized auto-correlation property and a power lower than an average power of a data signal.

18. The method of claim 17, wherein the channel estimation comprises:

acquiring a correlation value between the hidden pilot and a reference signal; and estimating the multipath by repeatedly accumulating the correlation value a predetermined number of times so that the correlation value has a first magnitude.

19. The method of claim 18, wherein the reference signal is the same as the hidden pilot, and the reference signal comprises a PN sequence of a predetermined length having a cyclic property.

20. The method of claim 17, further comprising:

estimating the frequency offset based on the correlation value of the hidden pilot; and estimating the timing offset based on the correlation value of the hidden pilot.

21. The transmission system according to claim 1, wherein the forward error correction encoder comprises:

a randomizer which randomizes incoming data;

a Reed Solomon encoder which assigns a Reed Solomon parity for error correction of the data;

an interleaver which interleaves the RS-parity assigned data according to a selected pattern; and a trellis encoder which trellis encodes the interleaved data at a 2/3 rate.

\* \* \* \* \*